United States Patent
Oohashi et al.

(10) Patent No.: US 6,424,071 B1
(45) Date of Patent: Jul. 23, 2002

(54) AUTOMOTIVE ALTERNATOR

(75) Inventors: Atsushi Oohashi; Yoshihito Asao, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/697,495

(22) Filed: Oct. 27, 2000

(30) Foreign Application Priority Data

Apr. 13, 2000 (JP) ........................................ 2000-111964

(51) Int. Cl.⁷ ................................................ H02K 3/00
(52) U.S. Cl. ...................... 310/180; 310/63; 310/184; 310/201; 310/263
(58) Field of Search ................................ 310/179, 180, 310/263, 52, 58, 63, 184, 207, 201

(56) References Cited

U.S. PATENT DOCUMENTS 5,952,749 A * 9/1999 Umeda et al. ................ 310/63
6,078,116 A * 6/2000 Shiga et al. ............... 310/60 R

FOREIGN PATENT DOCUMENTS

| JP | 3-27748 | 2/1991 |
| JP | 7-44797 | 5/1995 |

* cited by examiner

Primary Examiner—Burton S. Mullins
(74) Attorney, Agent, or Firm—Sughrue Mion, PLLC

(57) ABSTRACT

Front-end and rear-end coil ends constituting front-end and rear-end coil end groups are formed into a connection pattern composed of pairs of root portions extending outwards from pairs of slots 15a three slots apart, pairs of inclined portions bent from each of the pairs of root portions and extending in a circumferential direction, and pairs of joining portions connecting together end portions of the pairs of inclined portions. Inclined portions positioned on an inner circumferential side of the coil ends are inclined forwards relative to a rotational direction of fans.

8 Claims, 7 Drawing Sheets

ROTATIONAL DIRECTION

AUTOMOTIVE ALTERNATOR

BACKGROUND OF THE INVENTION

1. Field of the Invention

The present invention relates to an automotive alternator, and in particular, relates to a construction for coil end groups of a stator winding of the automotive alternator enabling a stator to be cooled efficiently by reducing a flow rate of cooling air flowing through the inside of a rotor.

2. Description of the Related Art

FIG. 5 is a cross section showing a conventional stator for an automotive alternator.

The conventional automotive alternator is constructed by rotatably mounting a Lundell-type rotor 7 by means of a shaft 6 inside a case 3 constituted by an aluminum front bracket 1 and an aluminum rear bracket 2, and fastening a stator 8 to an inner wall of the case so as to cover an outer circumferential side of the rotor 7.

The shaft 6 is rotatably supported in the front bracket 1 and the rear bracket 2. A pulley 4 is fastened to a first end of this shaft 6 so that rotational torque from an engine can be transmitted to the shaft 6 by means of a belt (not shown).

Slip rings 9 for supplying electric current to the rotor 7 are fastened to a second end of the shaft 6, and a pair of brushes 10 are housed in a brush holder 11 which is disposed inside the case 3 such that the pair of brushes 10 slide in contact with the slip rings 9. A regulator 18 for adjusting the output voltage generated in the stator 8 is fastened by adhesive to a heat sink 17 fitted onto the brush holder 11. A rectifier 12 which is electrically connected to the stator 8 and converts alternating current generated in the stator 8 into direct current is mounted inside the case 3.

The rotor 7 is constituted by a rotor winding 13 for generating magnetic flux on passage of electric current, and a pair of pole cores 20 and 21 disposed so as to cover the rotor winding 13, magnetic poles being formed in the pole cores 20 and 21 by the magnetic flux generated in the rotor winding 13. The pair of pole cores 20 and 21 are made of iron, each has a number of claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh. In addition, fans 5 are fastened to first and second axial ends of the rotor 7.

The stator 8 is constituted by a stator core 15, and a stator winding 16 composed by winding a conducting wire into the stator core 15, an alternating current being generated in the stator winding 16 by changes in the magnetic flux from the rotor 7 accompanying rotation of the rotor 7.

In the automotive alternator constructed in this manner, electric current is supplied from a battery (not shown) through the brushes 10 and the slip rings 9 to the rotor winding 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the stator winding 16, generating electromotive force in the stator winding 16. This alternating electromotive force passes through the rectifier 12 and is converted into direct current, the output is adjusted by the regulator 18, and the battery is recharged.

In the automotive alternator, the stator winding 16, the rectifier 12, the regulator 18, etc., constantly generate heat while generating electricity. Thus, in order to cool the heat generated by power generation, front-end and rear-end air intake openings 1a and 2a and front-end and rear-end air discharge openings 1b and 2b are disposed in the front bracket 1 and the rear bracket 2.

At the rear end, a cooling air flow $Q_R$ is formed by the rotation of the fans 5, cooling the rectifier 12, the regulator 18, and a rear-end coil end group 16r of the stator winding 16. In other words, external air is drawn in by the rotation of the fans 5 through the rear-end air intake openings 2a disposed facing both a heat sink 19 on the rectifier 12 and the heat sink 17 of the regulator 18, cooling the rectifier 12 and the regulator 18, then passes through fan blades 5a from an inner radial side to an outer radial side, cooling the rear-end coil end group 16r of the stator winding 16, and is discharged to the outside through the rear-end air discharge openings 2b.

At the same time, at the front end, a cooling air flow $Q_F$ is formed by the rotation of the fans 5, cooling a front-end coil end group 16f of the stator winding 16. In other words, external air is drawn in by the rotation of the fans 5 through the front-end air intake openings 1a in an axial direction, then passes through the fan blades 5a from a radially inner side to a radially outer side, cooling the front-end coil end group 16f of the stator winding 16, and is discharged to the outside through the front-end air discharge openings 1b.

In addition, a cooling air flow $Q_{Rt}$ flowing through the inside of the rotor 7 is generated as a result of a pressure difference between the front end and the rear end, cooling the rotor 7.

Now, because the stator winding 16 generates a high degree of heat, and output properties of the stator winding 16 deteriorate when the temperature is high, the stator winding 16 is constructed so as to enable reliable cooling by positioning the front-end and rear-end coil end groups 16f and 16r thereof between the fan blades 5a and the front-end and rear-end air discharge openings 1b and 2b, respectively.

Next, the stator winding construction used in the conventional automotive alternator will be explained with reference to FIG. 6. Moreover, FIG. 6 is a partial enlargement of the conventional stator viewed from an inner circumferential side.

In FIG. 6, the stator core 15 is formed into a cylindrical shape, and a number of slots 15a having a groove direction in an axial direction are disposed at even pitch in a circumferential direction so as to open onto the inner circumferential side. The stator winding 16 is constructed by joining together, using arc welding or the like, free end portions 29c of coil segments 29 inserted into pairs of slots 15a in which the slots 15a in each pair are three slots apart, so as to adopt a predetermined winding construction. As shown in FIG. 7, each of the coil segments 29 is a short segment of a conductor such as copper or the like having a circular cross section coated with insulation, the conductor being formed into a general U shape composed of a pair of straight portions 29a linked by a generally V-shaped turn portion 29b.

At the front end of the stator core 15, front-end coil ends 24 formed into a connection pattern composed of pairs of front-end root portions 24a extending outwards from pairs of slots 15a three slots apart, pairs of front-end inclined portions 24b bent from each of the pairs of front-end root portions 24a and extending in a circumferential direction, and pairs of front-end joining portions 24c connecting together end portions of the pairs of front-end inclined portions 24b, are arranged in a circumferential direction to constitute the front-end coil end group 16f. Moreover, the front-end joining portions 24c correspond to joint portions joining together the free end portions 29c of the coil segments 29.

Similarly, at the rear end of the stator core 15, rear-end coil ends 25 formed into a connection pattern composed of pairs of rear-end root portions 25a extending outwards from pairs of slots 15a three slots apart, pairs of rear-end inclined portions 25b bent from each of the pairs of rear-end root portions 25a and extending in a circumferential direction, and pairs of rear-end joining portions 25c connecting together end portions of the pairs of rear-end inclined portions 25b, are arranged in a circumferential direction to constitute the rear-end coil end group 16r. Moreover, the rear-end coil ends 25 correspond to the turn portions 29b of the coil segments 29.

In the stator winding 16 constructed in this manner, inner circumferential surfaces of the coil end groups 16f and 16r face the fan blades 5a and constitute blade-facing surfaces. The inclined portions 24b and 25b of the coil ends 24 and 25 constituting the blade-facing surfaces, that is to say, the inclined portions 24b and 25b positioned on the inner circumferential sides of the coil ends 24 and 25, are inclined so as to be parallel to each other and to be at a predetermined angle relative to the axis of the stator core 15.

A manufacturing method for the conventional stator winding 16 will now be explained with reference to FIGS. 8 and 9.

First, as shown in FIG. 8, the coil segments 29 are inserted from the rear end into pairs of slots 15a three slots apart. At that time, each of the coil segments 29 is inserted into an inner circumferential side in a slot depth direction of a first slot 15a and into an outer circumferential side in a slot depth direction of a second slot 15a three slots away. Then, the free end portions 29c of each of the coil segments 29 extending outwards from the slots 15a at the front end are bent circumferentially outwards away from each other.

Next, as shown in FIG. 9, two winding sub-portions each having one turn are prepared by joining together the free end portions 29c of adjacent coil segments 29. Then, the two winding sub-portions are connected in series to prepare one winding phase group having two turns in which the conductors are wound into a wave winding in every third slot 15a. At that time, at the front end of the stator core 15, the free end portions 29c of the adjacent coil segments 29 are stacked radially and joined, and the conductors of the coil segments 29 are constructed so as to fold back at the joint portions from the inner circumferential side to the outer circumferential side looking from above. Similarly, at the rear end of the stator coil 15, the conductors of the coil segments 29 are constructed so as to fold back at the turn portions 29b from the inner circumferential side to the outer circumferential side.

Two other winding phase groups are prepared in the same manner. The slots 15a into which the coil segments 29 are inserted are offset by one slot in each of the winding phase groups.

The stator winding 16 is constructed by connecting the three winding phase groups constructed in this manner into a three-phase alternating-current connection such as a Y-connection or a Δ-connection.

In the conventional automotive alternator, the conductors constituting the inclined portions 24b and 25b positioned on the inner circumferential side of the coil ends 24 and 25 constituting the coil end groups 16f and 16r of the stator winding 16 are parallel to each other and inclined at a predetermined angle relative to the axis of the stator core 15. In other words, the conductors constituting the front-end inclined portions 24b on the inner circumferential side are inclined forwards relative to the rotational direction of the fans 5, and the conductors constituting the rear-end inclined portions 25b on the inner circumferential side are inclined backwards relative to the rotational direction of the fans 5.

Thus, at the front end, the cooling air flow discharged from the fans 5 flows smoothly along the inner circumferential surfaces of the front-end inclined portions 25b on the inner circumferential side. At the same time, at the rear end, the cooling air flow discharged from the fans 5 interferes with the inner circumferential surfaces of the rear-end inclined portions 25b on the inner circumferential side, and causes an increase in wind resistance. As a result, the pressure difference between the front end and the rear end is increased by an imbalance in wind resistance between the front end and the rear end, causing the flow $Q_{Rt}$ of the cooling air flowing through the inside of the rotor 7 to increase. Thus, the overall flow rate of the air drawn in from the front end and the rear end decreases due to the increased loss of pressure inside the rotor caused by the flow $Q_{Rt}$. Because a portion of the rear-end intake volume flows into the inside of the rotor, the flow rate of the cooling air flow cooling the rear-end coil end group 16r is reduced, and one problem has been that the rear-end coil end group 16r cannot be cooled sufficiently.

Furthermore, as shown in portion A of FIG. 10, the cooling air flow discharged from the fans 5 has a wind speed distribution in an axial direction. Because the speed of the cooling air flow discharged from the fans 5 is higher at tips of the fan blades 5a close to free edges of the fans 5, the cooling air flow discharged from the fans 5 has a component flowing towards axial edges of the blades.

Thus, because the rear-end inclined portions 25b on the inner circumferential side of the rear-end coil ends 25 located on the blade-facing surface are all inclined backwards relative to the rotational direction of the fans 5, wind noise increases due to interference with the component of the cooling air flow flowing to the axial-edge side, wind resistance increases, lowering the overall air flow rate, and another problem has been that temperature increases in the cooled objects such as the rectifier 12 and the regulator 18 on the intake side of the fans 5 cannot be suppressed.

Furthermore, because the front-end inclined portions 24b on the inner circumferential side of the front-end coil ends 24 located on the blade-facing surface are all inclined forwards relative to the rotational direction of the fans 5, the cooling air flow discharged from the fan 5 flows smoothly along the inner circumferential surfaces of the front-end inclined portions 24b on the inner circumferential side, and yet another problem has been that heat transfer from the front-end coil ends 24 to the cooling air is not promoted, preventing temperature increases in the stator 8 from being suppressed.

SUMMARY OF THE INVENTION

The present invention aims to solve the above problems and an object of the present invention is to provide an automotive alternator enabling temperature increases in the stator to be suppressed by matching the inclination of the conductors constituting the inclined portions on the inner circumferential side of the coil ends to the wind speed distribution of the fan, suppressing the difference in pressure between the front end and the rear end to reduce the flow $Q_{Rt}$ of the cooling air flowing through the inside of the rotor, and ensuring a sufficient flow rate of the cooling air cooling the coil end groups.

Another object of the present invention is to provide an automotive alternator enabling wind resistance to be reduced and enabling the cooling of the internal parts on the intake side to be improved by inclining the conductors positioned on the blade-facing surfaces of the front-end and rear-end coil end groups forwards relative to the rotational direction of the fans 5.

Yet another object of the present invention is to provide an automotive alternator enabling cooling of the stator to be improved by inclining the conductors positioned on the blade-facing surfaces of the front-end and rear-end coil end groups backwards relative to the rotational direction of the fans 5 to promote heat transfer from the coil ends to the cooling air.

In order to achieve the above object, according to one aspect of the present invention, there is provided an automotive alternator including:

a rotor for forming north-seeking (N) and south-seeking (S) poles about a rotational circumference;

a stator including:

a cylindrical stator core formed in a circumferential direction with a number of slots extending axially, the stator core being disposed radially outside the rotor; and a stator winding wound into the stator core;

a bracket for supporting the rotor and the stator; and fans fastened to first and second axial ends of the rotor, wherein the stator winding includes a number of winding sub-portions in each of which a strand of wire is wound into the stator core in a connection pattern in which the strand of wire is drawn outside first slots, is folded back outside the slots, and enters second slots a predetermined number of slots away to constitute coil ends, wherein the coil ends are arranged in neat rows in a circumferential direction at a front end and a rear end of the stator core to constitute front-end and rear-end coil end groups, respectively, inner circumferential surfaces of the front-end and rear-end coil end groups constituting blade-facing surfaces, and wherein portions of the coil ends positioned in the blade-facing surfaces of the front-end and rear-end coil end groups are inclined in an identical direction relative to a rotational direction of the fans.

DETAILED DESCRIPTION OF THE PREFERRED EMBODIMENTS

The preferred embodiments of the present invention will now be explained with reference to the drawings.

Embodiment 1

Figure 1:
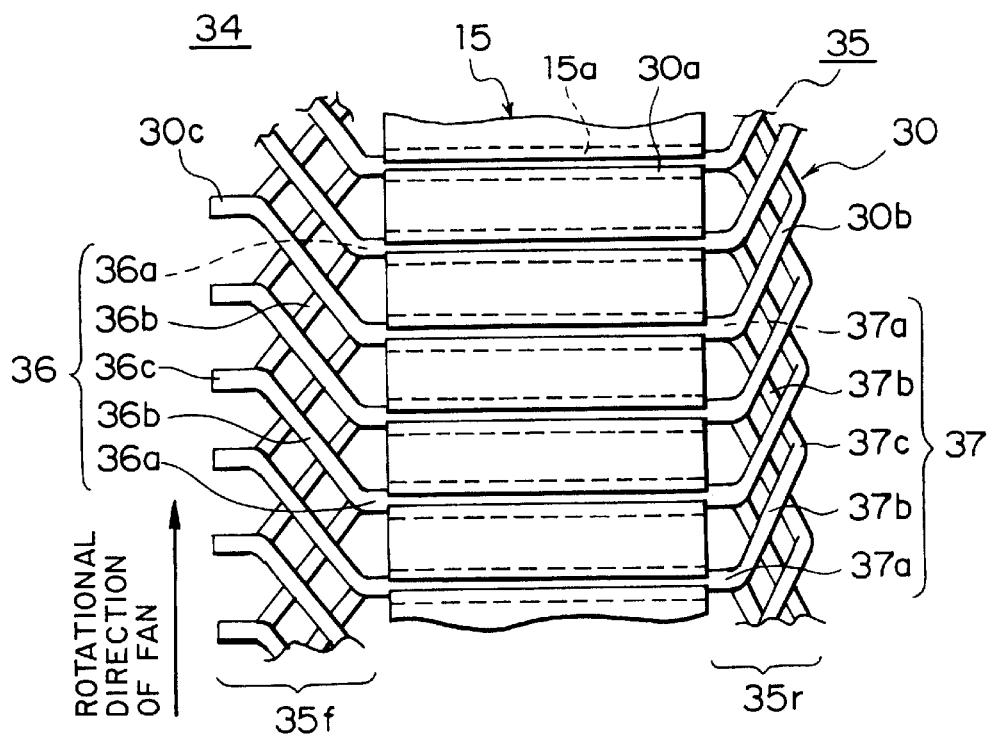
FIG. 1 is a partial enlargement of a stator used in an automotive alternator according to Embodiment 1 of the present invention viewed from an inner circumferential side.

FIG. 1 is a partial enlargement of a stator used in an automotive alternator according to Embodiment 1 of the present invention viewed from an inner circumferential side.

Figure 2:
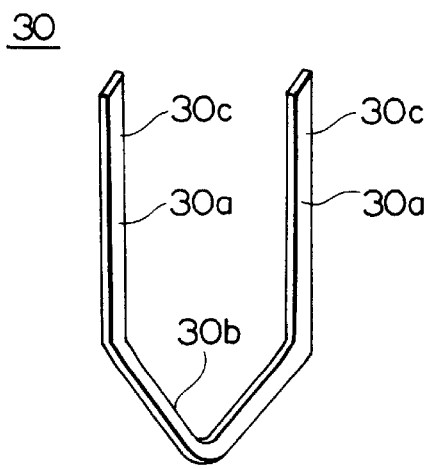
FIG. 2 is a perspective showing a coil segment used in the automotive alternator according to Embodiment 1 of the present invention.

In FIG. 1, a stator 34 is constituted by a stator core 15 and a stator winding 35 installed in the stator core 15. The stator core 15 is formed into a cylindrical shape, and a number of slots 15*a* having a groove direction in an axial direction are disposed at even pitch in a circumferential direction so as to open onto the inner circumferential side. The stator winding 35 is constructed by joining together, using arc welding or the like, free end portions 30*c* of coil segments 30 functioning as strands of wire inserted into pairs of slots 15*a* in which the slots 15*a* in each pair are three slots apart, so as to adopt a predetermined winding construction. As shown in FIG. 2, each of the coil segments 30 is a short segment made from a flat conductor such as copper or the like coated with insulation, the conductor being formed into a general U shape composed of a pair of straight portions 30*a* linked by a generally V-shaped turn portion 30*b*.

At the front end of the stator core 15, front-end coil ends 36 formed into a connection pattern composed of pairs of front-end root portions 36*a* extending outwards from pairs of slots 15*a* three slots apart, pairs of front-end inclined portions 36*b* bent from each of the pairs of front-end root portions 36*a* and extending in a circumferential direction, and pairs of front-end joining portions 36*c* connecting together end portions of the pairs of front-end inclined portions 36*b*, are arranged in a circumferential direction to constitute a front-end coil end group 35*f*. Moreover, the front-end joining portions 36*c* correspond to joint portions joining together the free end portions 30*c* of the coil segments 30.

Similarly, at the rear end of the stator core 15, rear-end coil ends 37 formed into a connection pattern composed of pairs of rear-end root portions 37*a* extending outwards from pairs of slots 15*a* three slots apart, pairs of rear-end inclined portions 37*b* bent from each of the pairs of rear-end root portions 37*a* and extending in a circumferential direction, and pairs of rear-end joining portions 37*c* connecting together end portions of the pairs of rear-end inclined portions 37*b*, are arranged in a circumferential direction to constitute a rear-end coil end group 35*r*. Moreover, the rear-end coil ends 37 correspond to the turn portions 30*b* of the coil segments 30.

Figure 3:
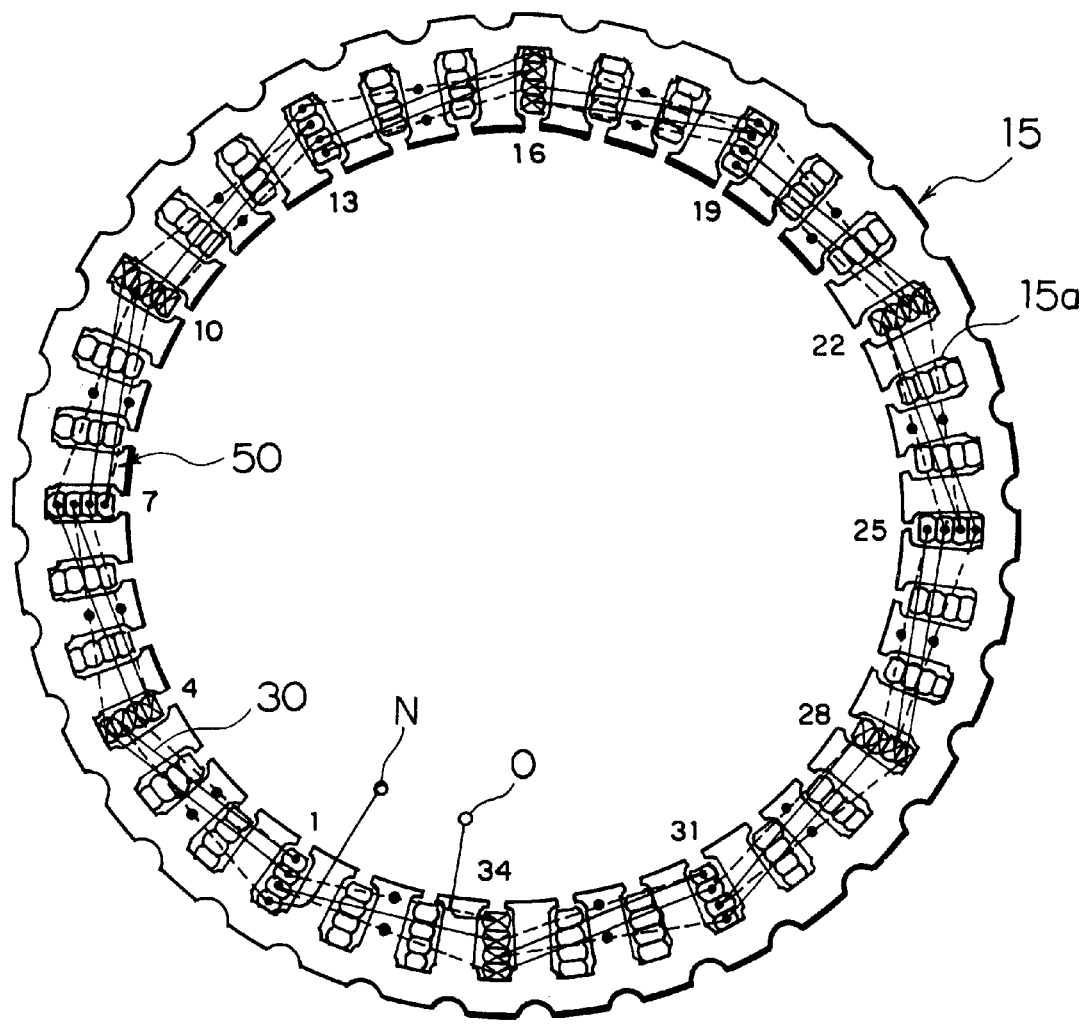
FIG. 3 is a rear-end elevation explaining connections in one stator winding phase group in a stator used in the automotive alternator according to Embodiment 1 of the present invention.

Next, a winding construction of the stator winding 35 will be explained with reference to FIG. 3. FIG. 3 is a rear-end elevation explaining connections in one stator winding phase group according to Embodiment 1 of the present invention. In FIG. 3, the rear-end connections are indicated by solid lines and the front-end connections by broken lines.

First, first and second coil segments 30 are inserted from the rear end into a first pair of slots 15a three slots apart, for example, into Slot Number 34 and Slot Number 1 of the slots 15a. At that time, the first coil segment 30 is inserted into a first position from the inner circumferential side in a slot depth direction (hereinafter called the first address) of Slot Number 34 and into a fourth position from the inner circumferential side in the slot depth direction (hereinafter called the fourth address) of Slot Number 1. The second coil segment 30 is inserted into the second position from the inner circumferential side in the slot depth direction (hereinafter called the second address) of Slot Number 34, and into the third position from the inner circumferential side in the slot depth direction (hereinafter called the third address) in Slot Number 1.

In addition, first and second coil segments 30 are inserted from the rear end into the remaining pairs of slots 15a three slots apart. At that time, the first coil segment 30 is inserted into the first address of a first slot 15a and the third address of a second slot 15a, and the second coil segment 30 is inserted into the second address of the first slot 15a and the fourth address of the first slot 15a.

Thus, four straight portions 30a of the coil segments 30 are housed so as to line up radially in one row in each of the slots 15a with the longitudinal direction of the rectangular cross sections thereof aligned.

Next, the free end portions 30c of the coil segments 30 inserted into the first address and the fourth address of the first slot pair constituted by Slot Number 34 and Slot Number 1 are bent in a clockwise direction in FIG. 3, and the free end portions 30c of the coil segments 30 inserted in the second address and the third address are bent in a counterclockwise direction in FIG. 3.

In addition, the free end portions 30c of the coil segments 30 inserted into the first address and the third address of the remaining pairs of slots 15a three slots apart are bent circumferentially inwards, that is, in a direction approaching each other. In addition, the free end portions 30c of the coil segments 30 inserted into the second address and the fourth address are bent circumferentially outwards (splayed shape), that is, in a direction away from each other.

Then, at the front end of the stator core 15, the free end portions 30c of the coil segments 30 extending outwards at the front end from the first address within first slots 15a and the free end portions 30c of the coil segments 30 extending outwards at the front end from the second address within second slots 15a three slots away are stacked radially and joined. Similarly, the free end portions 30c of the coil segments 30 extending outwards at the front end from the third address within the first slots 15a and the free end portions 30c of the coil segments 30 extending outwards at the front end from the fourth address within the second slots 15a three slots away are stacked radially and joined. These joint portions are indicated by the black circles in FIG. 3.

In addition, the turn portion 30b of the coil segment 30 inserted into the first and fourth addresses of the slot pair constituted by Slot Number 34 and Slot Number 1 is cut. Thus, one winding phase group 50 having four turns is prepared in which two lap-wound windings having two turns per lap are connected in series. At that time, the cut ends of the coil segment 30 inserted into the first and fourth addresses of the slot pair constituted by Slot Number 34 and Slot Number 1 become an output wire (O) and a neutral-point lead wire (N), respectively, of the winding phase group 50.

Two other winding phase groups 50 are prepared in the same manner. The slots 15a into which the coil segments 30 are inserted are offset by one slot in each of the winding phase groups 50.

The stator winding 35 is constructed by connecting each of the neutral-point lead wires of the three winding phase groups 50 constructed in this manner (three-phase alternating-current connection).

In the stator winding 35 constructed in this manner, because each of the rear-end coil ends 37 constituting the rear-end coil end group 35r are folded back from the inner circumferential side to the outer circumferential side at the rear-end connection portions 37c (the turn portions 30b), the rear-end coil ends 37 are neatly arranged to line up in two rows in a circumferential direction at a predetermined pitch from each other. Similarly, because each of the front-end coil ends 36 constituting the front-end coil end group 35f are folded back from the inner circumferential side to the outer circumferential side at the front-end connection portions 36c (the joint portions joining together the free end portions 30c), the front-end coil ends 36 are neatly arranged to line up in two rows in a circumferential direction at a predetermined pitch from each other.

Furthermore, the inner circumferential surfaces of the coil end groups 35f and 35r face the fan blades 5a, constituting blade-facing surfaces. The inclined portions 36b and 37b constituting the blade-facing surfaces, that is, the inclined portions 36b and 37b positioned on the inner circumferential side of the coil ends 36 and 37, are all inclined forwards relative to the rotational direction of the fan, matching the wind speed distribution on the discharge side of the fan 5.

Figure 5:
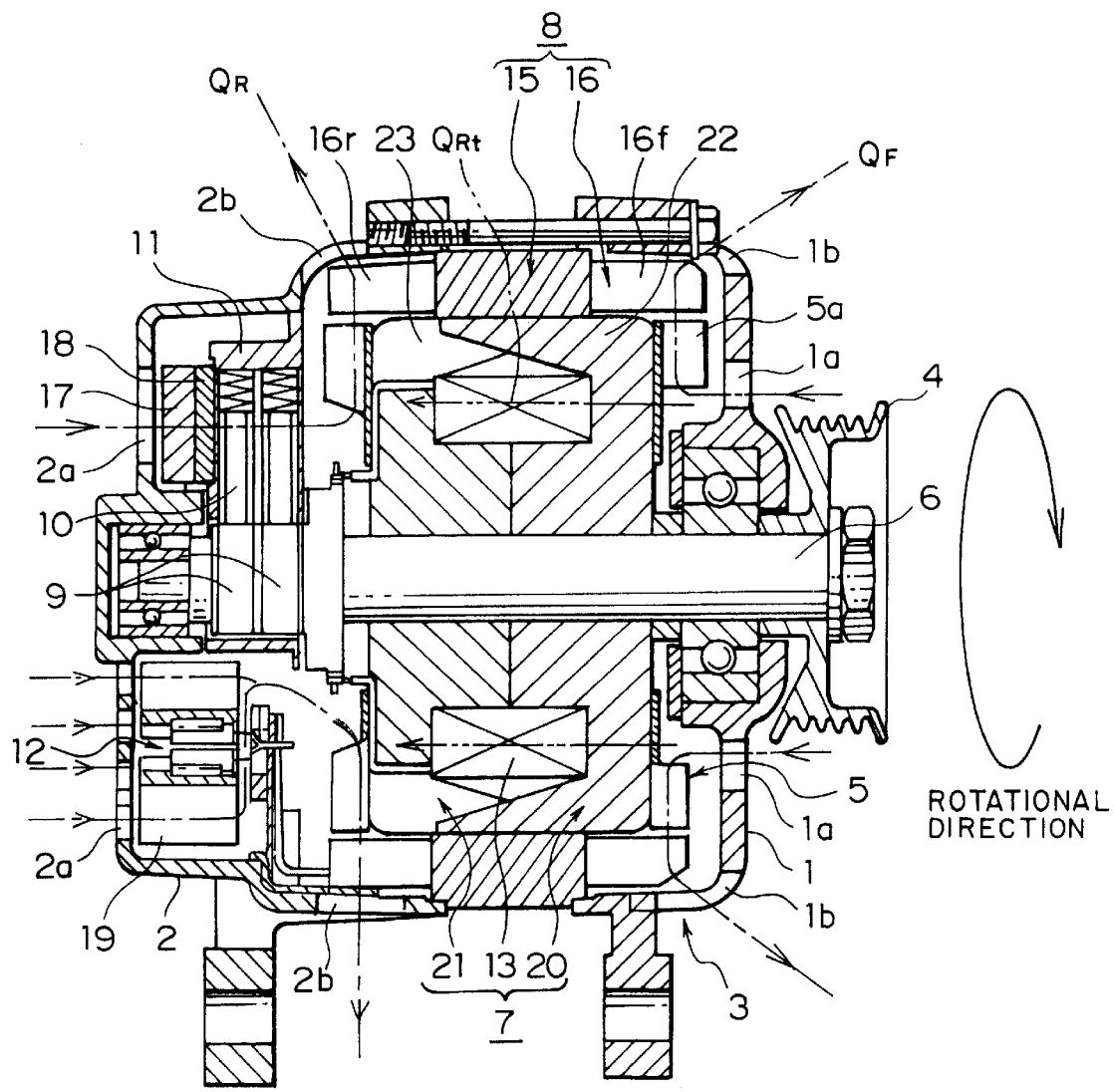
FIG. 5 is a cross section showing a conventional automotive alternator.
Figure 6:
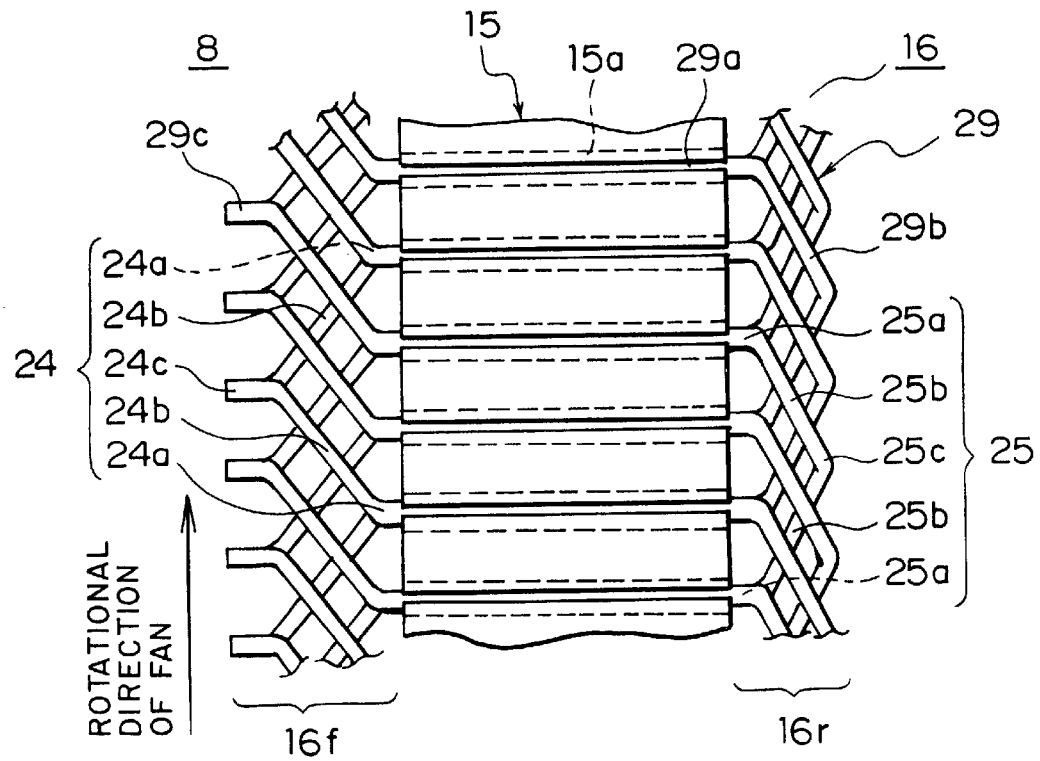
FIG. 6 is a partial enlargement of a stator used in the conventional automotive alternator viewed from an inner circumferential side.
Figure 7:
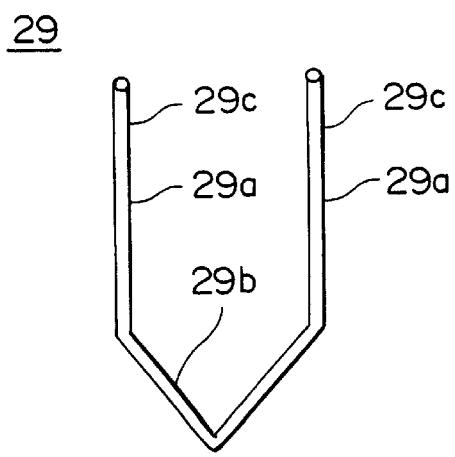
FIG. 7 is a perspective showing a coil segment used in a conventional stator winding.
Figure 8:
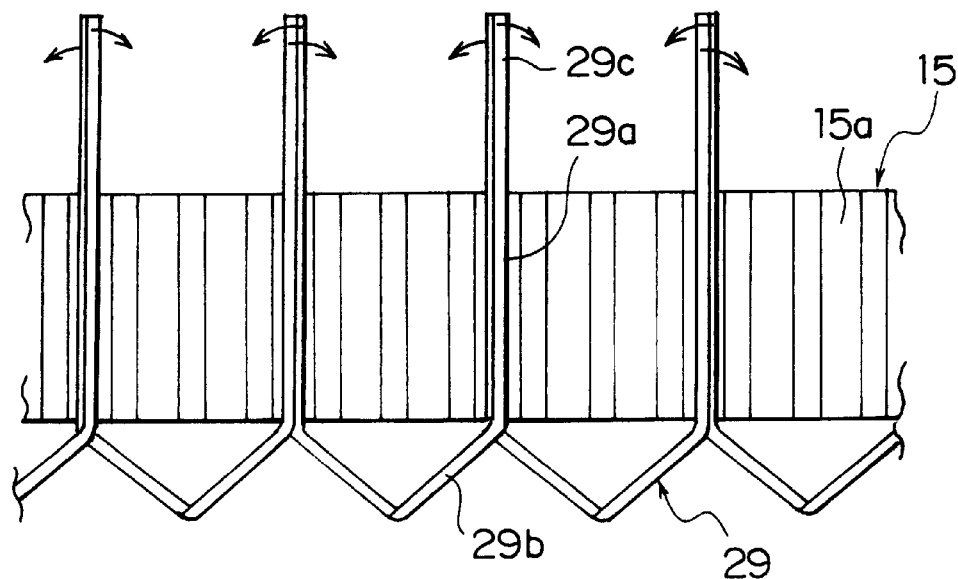
FIG. 8 is a diagram explaining a method of manufacture for the conventional stator.
Figure 9:
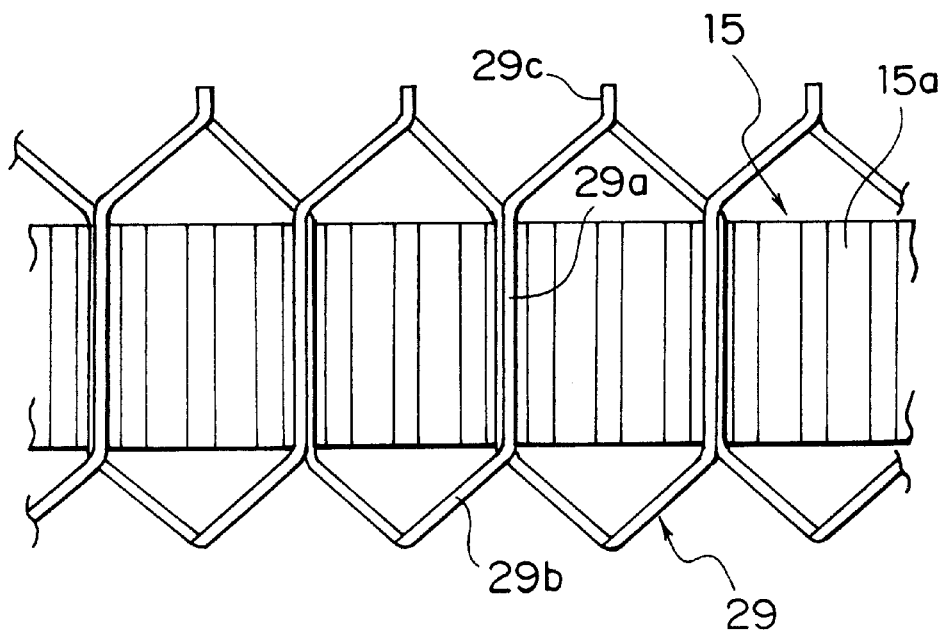
FIG. 9 is a diagram explaining a method of manufacture for the conventional stator.
Figure 10:
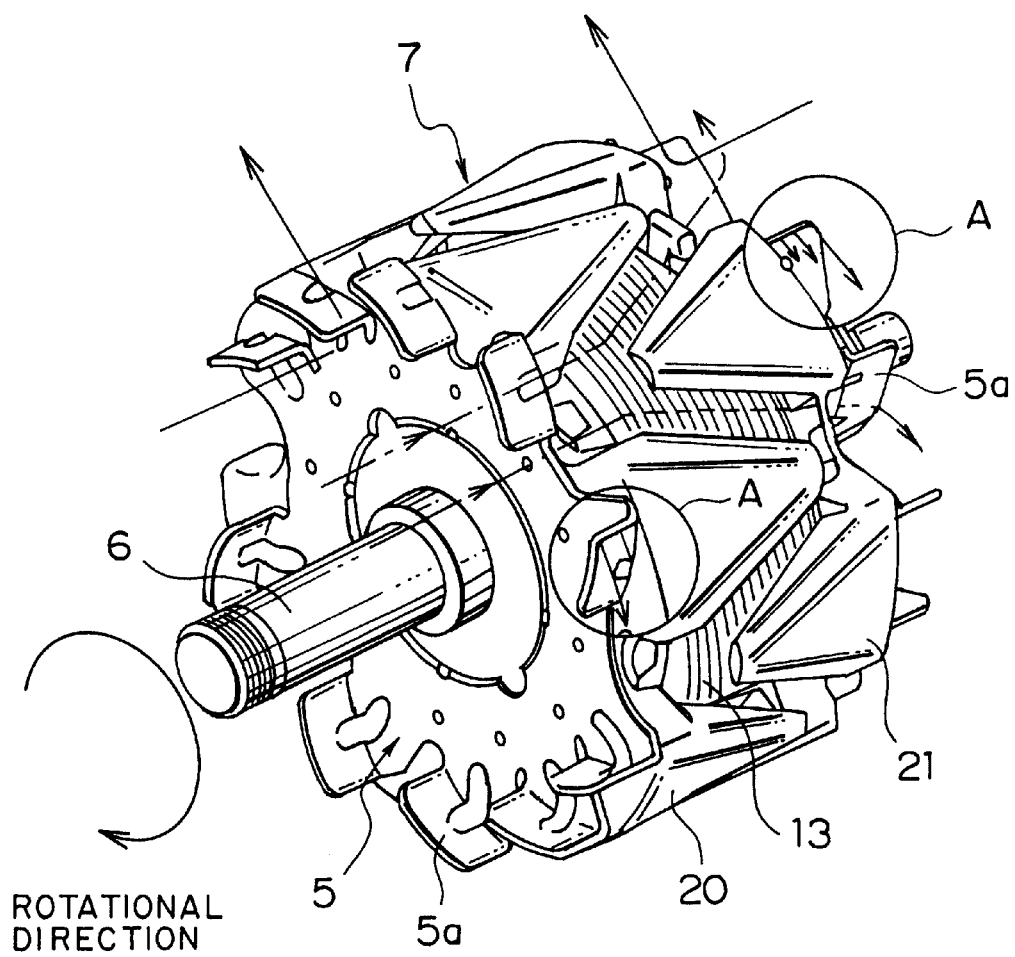
FIG. 10 is a perspective explaining a flow of cooling air in a generic automotive alternator.

The stator 34 constructed in this manner is mounted on an inner wall of the case 3 so as to cover an outer circumferential side of the rotor 7. Moreover, the automotive alternator according to Embodiment 1 of the present invention is constructed similarly to the automotive alternator shown in FIG. 5 except for the fact that the stator 34 is used instead of the stator 8.

Next, the flow of cooling air in this automotive alternator will be explained.

At the rear end, external air is drawn in by the rotation of the fans 5 through the rear-end air intake openings 2a disposed facing both a heat sink 19 on the rectifier 12 and the heat sink 17 of the regulator 18, cooling the rectifier 12 and the regulator 18, is then deflected centrifugally by the fans 5, cooling the rear-end coil end group 35r of the stator winding 35, and is discharged to the outside through the rear-end air discharge openings 2b. Because the rear-end inclined portions 37b on the inner circumferential side of the rear-end coil ends 37 are inclined forwards relative to the rotational direction of the fans, the cooling air flow discharged by the fans flows smoothly along inner circumferential surfaces of the rear-end inclined portions 37b on the inner circumferential side.

At the same time, at the front end, external air is drawn in by the rotation of the fans 5 through the front-end air intake openings 1a in an axial direction, is then deflected centrifugally by the fans 5, cooling the front-end coil end group 35f of the stator winding 35, and is discharged to the outside through the front-end air discharge openings 1b. Because the front-end inclined portions 36b on the inner circumferential side of the front-end coil ends 36 are inclined forwards relative to the rotational direction of the fans, the cooling air flow discharged by the fans flows smoothly along inner circumferential surfaces of the front-end inclined portions 36b on the inner circumferential side.

In the stator winding 35 according to Embodiment 1 of the present invention, each of the conductors of the coil ends 36 and 37 constituting the front-end and the rear-end coil end groups 35f and 35r are folded back from the inner circumferential side to the outer circumferential side at the front-end connection portions 36c. Thus, the coil ends 36 and 37 are arranged neatly to line up in a circumferential direction in the vicinity of the connection portions 36c and 37c. In other words, the coil ends 36 and 37 constituting the coil end groups 35f and 35r are formed into an identical shape around the entire circumference, improving alignment.

Portions of the coil ends 36 and 37 positioned in the blade-facing surfaces of the coil end groups 35f and 35r (the inclined portions 36b and 37b on the inner circumferential side) are inclined in the same direction relative to the rotational direction of the fans. In other words, the inner-circumferential inclined portions 36b and 37b are inclined forwards relative to the rotational direction of the fans, and match the wind speed distribution on the discharge side of the fans. Thus, the cooling air flow discharged from the front-end and rear-end fans 5 flows smoothly along the inner circumferential surfaces of the inner-circumferential inclined portions 36b and 37b, suppressing increases in wind resistance. As a result, because the pressure difference between the front end and rear end is eliminated, the flow rate of the cooling air flowing through the inside of the rotor 7 is reduced, and the overall air flow rate increases since pressure loss inside the rotor 7 is reduced, thereby suppressing temperature increases in the alternator.

At that time, the cooling air flow discharged from the front-end and rear-end fans 5 flows smoothly along the inner circumferential surfaces of the inner-circumferential inclined portions 36b and 37b, reducing the progress of heat transfer from the coil ends 36 and 37 to the cooling air flow, but because the overall air flow rate increases, temperature increases in the stator 34 are suppressed as a result.

Because wind resistance on the discharge side of the fans is reduced at the front end and the rear end, the air flow rate of the cooling air increases, suppressing temperature increases in internal parts on the intake side of the fans, such as the rectifier 12, the regulator 18, etc.

Because the cooling air flow discharged from the fans 5 flows smoothly along the inner circumferential surfaces of the inner-circumferential inclined portions 36b and 37b of the coil ends 36 and 37 at the front end and the rear end, interference with the cooling air flow is eliminated, enabling wind noise to be suppressed.

Because the stator winding 35 is constituted by generally U-shaped coil segments 30, the stator winding 35 can be easily installed in the stator core 15, enabling assembly to be improved, and an excessive bending process is no longer required, and short-circuiting between the coils and coil wire breakage do not occur, enabling reliability to be improved.

Because all of the coil segments 30 are inserted into the slots 15a from the rear end, the operation of joining the free end portions 30c can be carried out from the front end, improving the joining operation.

Because each of the coil segments 30 is made from a flat conductor, the cooling air flow-inducing effect of the coil ends 36 and 37 increases, allowing the cooling air to flow smoothly along the inner-circumferential surfaces of the inner-circumferential inclined portions 36b and 37b. As a result, interference with the cooling air flow is eliminated, enabling wind noise to be suppressed further.

Because the coil ends 36 and 37 are mutually spaced in a circumferential direction, the cooling air flow-inducing effect of the coil ends 36 and 37 increases. Thus, the cooling air flows smoothly along the inner-circumferential inclined portions 36b and 37b, enabling wind noise to be suppressed further.

Furthermore, the outer shape of the joint portions joining the free end portions 30c of the coil segments 30 increases in size, becoming a factor which increases wind noise due to interference with the cooling air flow. However, because the front-end coil ends 36 on the joint portion side of the free end portions 30c are inclined forwards relative to the rotational direction of the fans, interference between the joint portions and the cooling air flow is reduced, enabling worsening of the wind noise to be suppressed.

Embodiment 2

Figure 4:
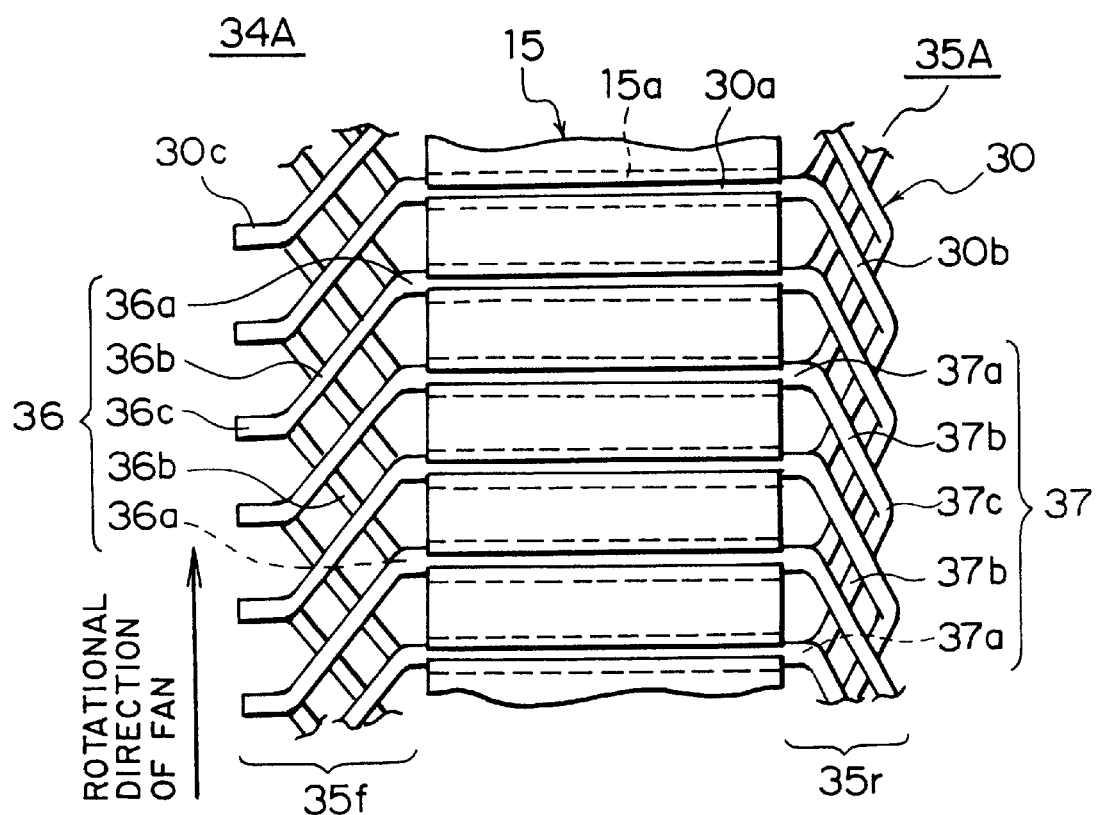
FIG. 4 is a partial enlargement of a stator used in an automotive alternator according to Embodiment 2 of the present invention viewed from an inner circumferential side.

In the stator 34A according to Embodiment 2 of the present invention, the inclined portions 36b and 37b of the coil ends 36 and 37 constituting the blade-facing surfaces of the front-end and rear-end coil end groups 35f and 35r of the stator winding 35A, in other words, the inclined portions 36b and 37b positioned on the inner circumferential side of the coil ends 36 and 37, are all inclined backwards relative to the rotational direction of the fans, as shown in FIG. 4.

Moreover, the rest of the construction is constructed similarly to Embodiment 1.

In Embodiment 2, because the inner-circumferential inclined portions 36b and 37b of the coil ends 36 and 37 constituting the front-end and rear-end coil end groups 35f and 35r are all inclined in the same direction relative to the rotational direction of the fans, the pressure difference between the front end and the rear end is eliminated, reducing pressure loss inside the rotor. Consequently, in Embodiment 2, the flow rate of the cooling air flowing through the inside of the rotor is also reduced, increasing the overall air flow rate and enabling temperature increases in the alternator to be suppressed.

Furthermore, because the inner-circumferential inclined portions 36b and 37b of the coil ends 36 and 37 constituting the front-end and rear-end coil end groups 35f and 35r are all inclined backwards relative to the rotational direction of the fans, the cooling air flow discharged from the fans 5 collides with the inner circumferential surfaces of the inner-circumferential inclined portions 36b and 37b, enabling promotion of heat transfer from the coil ends 36 and 37 to the cooling air, thereby enabling temperature increases in the stator 34 to be suppressed.

Moreover, in the present invention, it is desirable for each coil segment 30 to be made from a flat conductor from the point of view of cooling air flow-inducing effects, but the coil segment made from a conductor having a circular cross section may also be used provided that the inclined portions on the circumferential side of the front-end and rear-end coil ends are inclined in the same direction relative to the rotational direction of the fans.

Furthermore, in each Embodiment, the stator winding is constructed by connecting a large number of coil segments 30 so as to adopt a predetermined winding construction, but the stator winding may also be constructed by winding a number of continuous wires into the stator core so as to adopt a predetermined winding construction.

The present invention is constructed in the above manner and exhibits the effects described below.

According to one aspect of the present invention, there is provided an automotive alternator including:

a rotor for forming north-seeking (N) and south-seeking (S) poles about a rotational circumference;

a stator including:

a cylindrical stator core formed in a circumferential direction with a number of slots extending axially, the stator core being disposed radially outside the rotor; and a stator winding wound into the stator core;

a bracket for supporting the rotor and the stator; and fans fastened to first and second axial ends of the rotor, wherein the stator winding includes a number of winding sub-portions in each of which a strand of wire is wound into the stator core in a connection pattern in which the strand of wire is drawn outside first slots, is folded back outside the slots, and enters second slots a predetermined number of slots away to constitute coil ends, wherein the coil ends are arranged in neat rows in a circumferential direction at a front end and a rear end of the stator core to constitute front-end and rear-end coil end groups, respectively, inner circumferential surfaces of the front-end and rear-end coil end groups constituting blade-facing surfaces, and wherein portions of the coil ends positioned in the blade-facing surfaces of the front-end and rear-end coil end groups are inclined in an identical direction relative to a rotational direction of the fans, eliminating pressure differences between the front end and the rear end and reducing the flow rate of the cooling air flowing through the inside of the rotor, thereby providing an automotive alternator enabling internal parts on the intake side of the fans and the stator to be effectively cooled by reducing pressure loss inside the rotor and increasing the overall air flow rate.

The portions of the coil ends positioned in the blade-facing surfaces of the front-end and rear-end coil end groups may be inclined forwards relative to the rotational direction of the fans, enabling wind noise to be reduced, and enabling the cooling of the internal parts on the intake side of the fans to be improved.

The portions of the coil ends positioned in the blade-facing surfaces of the front-end and rear-end coil end groups may be inclined backwards relative to the rotational direction of the fans, enabling the promotion of heat transfer from the coil ends to the cooling air, thereby improving the cooling of the stator.

The strands of wire may be made from a flay conductor, increasing the cooling air flow-inducing effect of the coil ends.

The coil ends in the coil end groups may be mutually spaced in a circumferential direction, increasing the cooling air flow-inducing effect of the coil ends, and enabling wind noise to be reduced.

The strands of wire may be generally U-shaped coil segments, and the stator winding may be constructed by inserting the coil segments into each pair of the first and second slots, and joining free end portions of the coil segments, enabling the winding of the stator winding into the stator core to be simplified, thereby improving assembly.

The strands of wire may be generally U-shaped coil segments, the stator winding may be constructed by inserting the coil segments into each pair of the first and second slots from a first end of the stator core, and joining free end portions of the coil segments extending outwards from a second end of the stator core, and the portions of the coil ends positioned in the blade-facing surfaces of the front-end and rear-end coil end groups may be inclined forwards relative to the rotational direction of the fans, reducing interference between the joint portions joining the free end portions together and the cooling air flow, thereby suppressing worsening of wind noise.

What is claimed is:

1. An automotive alternator comprising:
    a rotor forming north-seeking (N) and south-seeking (S) poles about a rotational circumference;
    a stator comprising:
        a cylindrical stator core formed in a circumferential direction with a number of slots extending axially, said stator core being disposed radially outside said rotor; and
        a stator winding wound into said stator core;
    a bracket for supporting said rotor and said stator; and
    fans fastened to first and second axial ends of said rotor and including fan blades,
    wherein said stator winding comprises a number of winding sub-portions, in each of which a strand of wire is wound into said stator core in a connection pattern in which said strand of wire is drawn outside a first slot, is folded back toward said slots, and enters a second slot a predetermined number of slots away, to constitute coil ends,
    wherein said coil ends are arranged in rows in a circumferential direction at a front end and a rear end of said stator core to constitute front-end and rear-end coil end groups, respectively, inner circumferential surfaces for said front-end and rear-end coil end groups constituting blade-facing surfaces, and
    wherein said blade-facing surfaces of said front-end and rear-end coil end groups are inclined in an identical direction relative to a rotational direction of said fans.

2. The automotive alternator according to claim 1 wherein said blade-facing surfaces of said front-end and rear-end coil end groups are inclined forward relative to said rotational direction of said fans.

3. The automotive alternator according to claim 2 wherein:
    said strands of wire are generally U-shaped coil segments; and
    said stator winding is constructed by inserting a coil segment into each pair of said first and second slots from a first end of said stator core, and joining free end portions of said coil segments extending outwardly from a second end of said stator core.

4. The automotive alternator according to claim 1 wherein said blade-facing surfaces of said front-end and rear-end coil end groups are inclined backwards relative to said rotational direction of said fans.

5. The automotive alternator according to claim 4 wherein:
    said strands of wire are generally U-shaped coil segments; and said stator winding is constructed by inserting a coil segment into each pair of said first and second slots from a first end of said stator core, and joining free end portions of said coil segments extending outwardly from a second end of said stator core.

6. The automotive alternator according to claim 1 wherein said strands of wire are made from a flat conductor.

7. The automotive alternator according to claim 1 wherein said coil ends in said coil end groups are mutually spaced in a circumferential direction.

8. The automotive alternator according to claim 1 wherein:
    said strands of wire are generally U-shaped coil segments; and
    said stator winding is constructed by inserting a coil segment into each pair of said first and second slots, and joining free end portions of said coil segments.

* * * * *